United States Patent
McDermott et al.

(10) Patent No.: US 7,596,170 B2
(45) Date of Patent: Sep. 29, 2009

(54) COHERENT DETECTION WITHOUT TRANSMISSION PREAMBLE

(75) Inventors: Scott A. McDermott, Washington, DC (US); James F. Stafford, Ashburn, VA (US); Luis G. Jordan, Charles Town, WV (US)

(73) Assignee: AeroAstro, Inc., Ashburn, VA (US)

( * ) Notice: Subject to any disclaimer, the term of this patent is extended or adjusted under 35 U.S.C. 154(b) by 0 days.

(21) Appl. No.: 11/876,747

(22) Filed: Oct. 22, 2007

(65) Prior Publication Data
US 2008/0095215 A1    Apr. 24, 2008

Related U.S. Application Data (63) Continuation-in-part of application No. 11/681,759, filed on Mar. 3, 2007, now Pat. No. 7,433,391, which is a continuation-in-part of application No. 10/208,882, filed on Jul. 31, 2002, now Pat. No. 7,227,884, which is a continuation-in-part of application No. 09/513,962, filed on Feb. 28, 2000, now Pat. No. 6,985,512.

(60) Provisional application No. 60/853,735, filed on Oct. 23, 2006, provisional application No. 60/859,833, filed on Nov. 17, 2006.

(51) Int. Cl.
*H04B 1/69* (2006.01)
*H04B 1/707* (2006.01)
*H04B 1/713* (2006.01)

(52) U.S. Cl. ............... 375/147; 375/150; 375/142; 375/149; 375/145; 370/320; 370/335

(58) Field of Classification Search ......... 375/147–153; 370/342, 320, 335, 441
See application file for complete search history.

(56) References Cited

U.S. PATENT DOCUMENTS

| | | | |
|---|---|---|---|
| 6,421,373 B1* | 7/2002 | Saito | 375/148 |
| 6,728,298 B1* | 4/2004 | Okubo et al. | 375/146 |
| 6,876,645 B1* | 4/2005 | Guey et al. | 370/342 |
| 6,944,149 B1* | 9/2005 | Kim et al. | 370/349 |

* cited by examiner

*Primary Examiner*—Phuong Phu
(74) *Attorney, Agent, or Firm*—Robert M. McDermott, Esq.

(57) ABSTRACT

A receiving system allows for the coherent detection of a spread-spectrum transmission at any point in time during the transmission, thereby avoiding the need to identify the start of the transmission during the transmission-detection process. An input buffer captures the transmissions on a communication channel using a moving time-window. A detector processes a time-slice from the input buffer and identifies all of the simultaneously transmitting transmitters during that time-slice. As each transmitter is identified, the demodulator traces back-in-time to identify where the message can first be detected in the input buffer. The transmission includes suitable characteristics to facilitate detection and demodulation of the message content, but need not contain a preamble to allow the detection process.

25 Claims, 3 Drawing Sheets

COHERENT DETECTION WITHOUT TRANSMISSION PREAMBLE

This is a continuation-in-part of U.S. patent application Ser. No. 11/681,759, filed 3 Mar. 2007 now U.S. Pat. No. 7,433,391, which is a continuation-in-part of U.S. patent application Ser. No. 10/208,882, filed 31 Jul. 2002 now U.S. Pat. No. 7,227,884, which is a continuation-in-part of file Ser. No. 09/513,962, now U.S. Pat. No. 6,985,512, filed 28 Feb. 2000 and issued 10 Jan. 2006, each of which are incorporated by reference herein. This application also claims the benefit of U.S. Provisional Patent applications 60/853,735 filed 23 Oct. 2006, and 60/859,833, filed 17 Nov. 2006.

BACKGROUND AND SUMMARY OF THE INVENTION

This invention relates to the field of communications, and in particular to the processing of multiple asynchronous spread-spectrum communications.

Spread-Spectrum techniques are used to modulate an information signal such that the modulated signal appears as noise. The information is modulated by a pseudo-random sequence of bits, and can be demodulated, or despread, using the same pseudo-random sequence. This modulation is commonly referred to as Direct-Sequence Spread Spectrum (DSSS). The modulated signal is spread across a bandwidth that is substantially larger than the bandwidth of the information signal, and has the apparent effect of increasing the noise-floor of receivers that receive this signal. Applying the same pseudo-random sequence to the modulated signal allows the information signal to be detected within this apparent noise.

Code Division Multiple Access (CDMA) is a commonly used spread-spectrum communications technique wherein the information signal is encoded by one of many code sequences before it is transmitted. The received signal is decoded by the same code sequence to reproduce the original information signal. Transmissions from multiple transmitters can be simultaneously communicated via a common frequency channel by employing different code sequences for each transmitter, provided that the code sequences have particular uniqueness characteristics. The uniqueness characteristics of acceptable codes substantially guarantee that a coherent output will only be produced when the received signal corresponds to a signal that is encoded using the same code sequence. Signals that are not encoded using the same code sequence as the decoding code sequence exhibit minimal coherence and are filtered out as noise signals. In a conventional CDMA system, such as a cellular telephone network, the network controller allocates and deallocates code sequences on demand, so that each of the transmitters can transmit over the same network without interference from other transmitters.

A significant characteristic of a pseudo-random spread spectrum code is that a coherent output is only produced when the decoding code sequence is applied substantially in phase with the encoding code sequence. If the received signal is decoded with a code-phase that is out of phase with the transmitter, and the code is a proper pseudo-noise code, having the above defined uniqueness characteristics, then the decoding of this out-of-phase signal produces a noise output. U.S. Pat. No. 5,537,397, "SPREAD ALOHA CDMA DATA COMMUNICATIONS", issued Jul. 16, 1996, to Norman Abramson, and incorporated by reference herein, discloses a technique that uses this phase-dependency characteristic to allow multiple transmitters to use the same code concurrently. As in the conventional CDMA system, the network controller provides an allocation to each transmitter, but in the referenced patent, each transmitter is allocated a different timeslot, or code-phase, rather than a different code. The controller instructs each transmitter to advance or delay its transmission, so that its signal is received at the receiver with a code-phase that is sufficiently different from the code-phase of other transmitters. In this manner, although each of the transmitters and the receiver use the same code, each transmitter provides a "different" (phase-shifted) code to the receiver, relative to the particular code-phase of the decoder at the time of decoding.

The aforementioned prior art technique requires a unique identification of each mobile transmitter, because the communication of each allocated code or code-phase must be directed to the appropriate transmitter. Each mobile transmitter must also be equipped with a receiver, to receive and process the communicated phase allocation. In conventional cell-phone systems, each base station transmits a pilot signal that the mobile systems use to synchronize their code-phase to the base station's phase. Due to propagation delays and other factors, this synchronization is a 'coarse' synchronization that allows the base station to locate the transmissions within a relatively narrow timespan of when the "in-phase" transmissions should be received at the base-station. Once the in-phase signal is received at the base station, a phase-locked loop is used to assure that the base station receiver remains in sync with the mobile transmitter, to compensate for any differences between the transmitter's frequency and the receiver's frequency. That is, a separate phase locked loop is required for each currently active transmitter.

The requirement to dedicate a receiver to each active transmitter requires the use of multiple receivers operating in parallel, which can become costly, particularly if the receiving system needs to be designed for a 'peak' number of simultaneously transmitting transmitters.

U.S. Pat. No. 6,128,469, "SATELLITE COMMUNICATION SYSTEM WITH A SWEEPING HIGH-GAIN ANTENNA", issued 3 Oct. 2000 to Ray Zenick, John Hanson, Scott McDermott, and Richard Fleeter, and U.S. Pat. No. 6,396,819, "LOW-COST SATELLITE COMMUNICATION SYSTEM", issued 28 May 2002 to Richard Fleeter, John Hanson, Scott McDermott, and Ray Zenick, and U.S. Pat. No. 6,317,029, "IN-SITU REMOTE SENSING" issued 13 Nov. 2001 to Richard Fleeter, disclose systems and methods that facilitate the reception and processing of messages from a large number of preferably low-cost transmitters, and are each incorporated by reference herein. For example, a large number of IC chip-size transmitters may be released from an aircraft that overflies a hurricane or forest fire. These transmitters may be configured to periodically or randomly transmit their location and the atmospheric conditions at their location, such as temperature, pressure, moisture content, and so on. A receiving system receives and processes the transmissions from these many devices and provides temperature and pressure profiles, changes and trends, predictions, and the like. Such systems require simple, low-cost, and efficient transmitters.

Conventionally, communication messages (whether spread-spectrum or not) include a 'preamble' (also known as a 'front porch') that is prepended to the information content of the message to facilitate all necessary synchronization of the receiver to the transmitted signal and other required functions, such as identifying the beginning of each message, identifying bit polarity, aligning data packets, and so on. However, in the above referenced applications, the transmitters are often required to be portable and battery-operated. In applications where the information content is small, such as a report of the security of a lock on a transport container, the transmission of the preamble with each short message often consumes more energy than the transmission of the information. It also occupies a disproportionate amount of total system bandwidth, reducing the maximum number of possible users in the system: time spent transmitting non-information-containing preamble bits is time another device cannot spend transmitting useful data. In an information theory sense, the most useful communication is a highly stochastic bit sequence, yet the purpose of a preamble is to be a completely nonstochastic (predictable) bit sequence.

It would be advantageous to provide a receiving system that is configured to distinguish among transmissions from a plurality of transmitters that share a communication channel and use a common DSSS code sequence without requiring a preamble with each message. Correspondingly, it would be advantageous to provide a DSSS transmitter that does not transmit a preamble with each message. It would also be advantageous to allow a single receiving system to search for all present transmitters, to avoid having to provide multiple parallel-operating receivers.

These objects and others are achieved by providing a receiving system that allows for the detection of a transmission at any point in time during the transmission, thereby avoiding the need to identify the start of the transmission during the transmission-detection process. An input buffer captures the transmissions on a communication channel using a moving time-window. A detector processes a time-slice from the input buffer and identifies all of the simultaneously transmitting transmitters during that time-slice. As each transmitter is identified, the demodulator traces back-in-time to identify where the message can first be detected in the input buffer. The transmission includes suitable characteristics to facilitate detection and demodulation of the message content, but need not contain a preamble to allow the detection process. Provided that the time-window of the input buffer is sufficiently large to include the time required to find all of the transmissions in the time-slice and includes the time back to the previous time-slice, no information will be lost.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
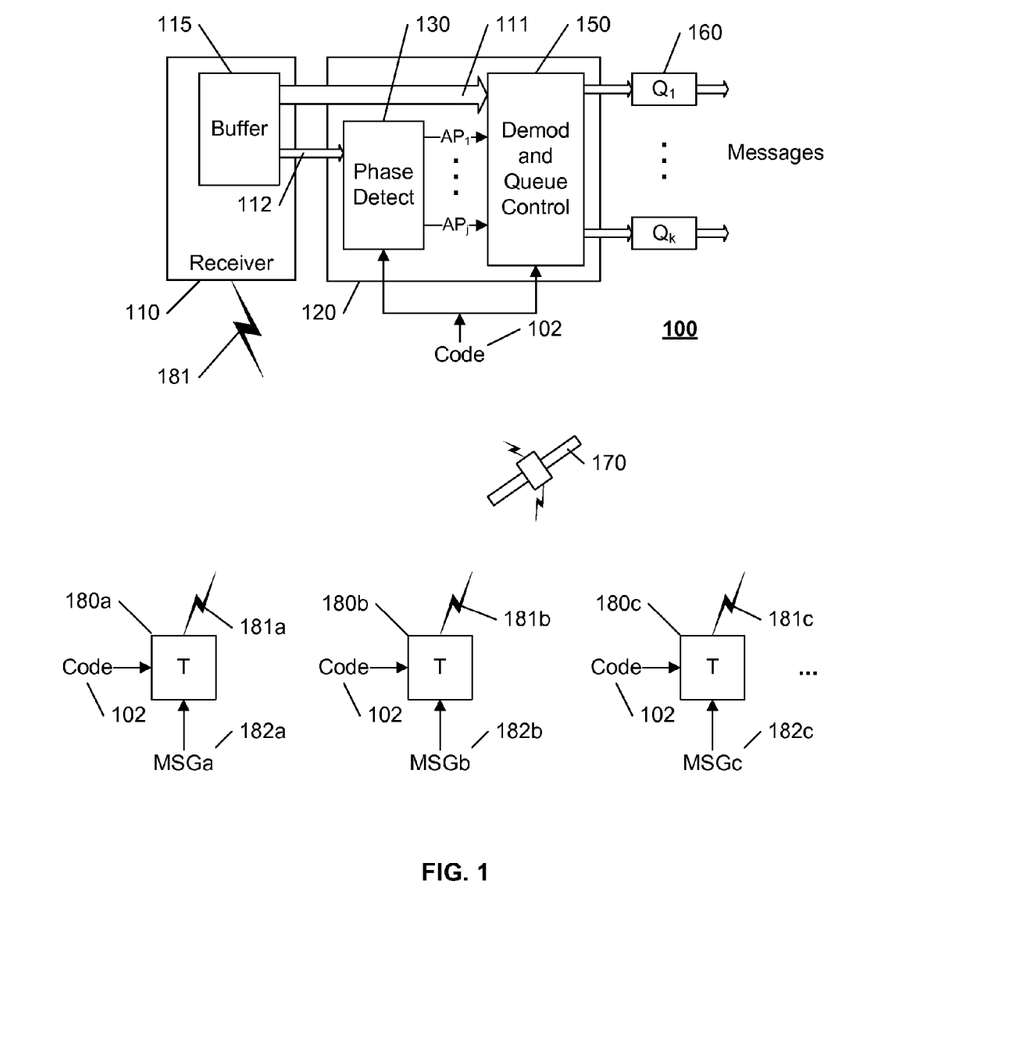
FIG. 1 illustrates an example block diagram for a communications system in accordance with this invention.

FIG. 1 illustrates an example block diagram of a communications system 100 in accordance with this invention. The communications system 100 includes a plurality of transmitters 180$a$-180$c$, a receiver 110, and a message discriminator 120. The transmitters 180$a$-$c$ each provide a transmit signal 181$a$-$c$ comprising a message 181$a$-$c$ that is encoded using a spreading-code 102. To obtain a high degree of discrimination at different code-phases, and to optimize the decoding process, as detailed further below, a "maximal length sequence" or "M-Sequence" is preferably used as the spreading code. Maximal length sequences are simple to generate using maximal linear feedback shift registers.

Each transmitter 180$a$-$c$ is substantially autonomous, and each transmitter 180$a$-$c$ uses the same encoding and communications parameters, including the same spreading-code 102, and the same nominal frequency to provide the transmit signal 181$a$-$c$ over the same communications channel. These transmit signals 181$a$-$c$ form a composite signal 181 within this common communications channel. If two or more transmitters 180$a$-$c$ transmit at the same time and at the same code-phase and essentially the same frequency, a collision results and these transmissions will not be distinguishable within the composite signal 181. If only one transmitter 180$a$-$c$ is transmitting at a given code-phase, the transmitted message 181$a$-$c$ will be decodable at this code-phase.

There are a number of applications that include the communication of relatively short and non-critical messages. Because a typical code 102 includes a sequence of hundreds or thousands of bits, thereby forming hundreds or thousands of code-phases for each bit of a message, the likelihood of two infrequently transmitting devices transmitting at exactly the same code-phase at the same time is slight. Because the messages are non-critical, the loss of individual messages because of this possibility of an exact phase coincidence is acceptable. For example, application of U.S. Pat. No. 6,317,019, "IN-SITU REMOTE SENSING", referenced above, includes the sensing of moisture content over a vast geographic area. Collectively, this information is useful and significant, but the intermittent loss of reports from individual collectors would not be significant. Because the odds are in favor of subsequent or prior reports from these collectors being transmitted without collision, and the rate of change of information content from these collectors can be expected to be low, the loss of individual reports has an insignificant effect on the collective information.

Other applications that are particularly well suited for this invention include, for example, cargo or container tracking; intrusion or trespass detection; emergency beacons; pipeline monitors; utility consumption meters; and so on. An infrequently transmitting beacon on a cargo container, for example, will use very little power, and can be economically provided to allow tracking of even small containers. If some intermediate reports of the container's location are lost due to collisions with other transmissions, the effect will be non-consequential. In like manner, if pressure-sensing transmitters are dispersed over an open area, pedestrian or vehicular traffic across this area can be readily detected, even if some of the transmissions from the transmitters are lost. Large areas, such as airports, harbors, bridge and tunnel accessways, and so on, can be monitored for threats by distributing nuclear, chemical, or biological sensors throughout the area. In like manner, such sensors could be placed at intervals along all major roadways leading to a metropolitan area. If many such sensors are distributed, the alarms will be triggered sequentially, as the hazard material is moved from one sensor's coverage area to the next, and the likelihood of interference would be minimal. Similarly, an emergency beacon need only be detected once to have a desired rescue effect. These and other applications will be evident to one of ordinary skill in the art in view of this disclosure.

As disclosed in the above referenced U.S. Pat. No. 6,317,019, "IN-SITU REMOTE SENSING", and in U.S. Pat. No. 6,396,819, "LOW-COST SATELLITE COMMUNICATION SYSTEM", also referenced above, these applications are particularly well suited for satellite-relay configurations, wherein a satellite 170 receives the composite signal from all of the transmitters within view of the satellite 170 and relays the composite information to a base station 100, in either a 'store-and-forward' mode, when the remote stations 180*a-c* and the base station 100 are not contemporaneously in view of the satellite 170, or in a 'bent-pipe' mode, wherein the satellite 170 receives the information from the remote stations 180*a-c* and merely retransmits the information to the base station 100, typically at a different transmission frequency. Because the satellite 170 and base station 100 can be configured with directional antennas, a significant gain in signal to noise ratio can be achieved by such a configuration, without requiring a directional antenna at each remote station 180*a-c*. In the aforementioned area coverage embodiment, such as sensors throughout an airport or harbor, the receiving system would typically be located at the protected area, perhaps using multiple receivers/repeaters that forward their signals to a hub, or to individual receiver/detector sub-systems. For the purposes of this invention, the signal 181 that is received at the base station 100 is considered to be the composite of the individual transmissions 181*a-c*, regardless of whether this composite 181 is relayed through one or more relays, such as a satellite 170, and regardless of whether it is received by a single receiver or multiple receivers.

The receiver 110 receives the composite signal 181 and continually stores samples of this composite signal in a receiver buffer 115 as received signal 182. Because the receive buffer 115 is of finite size, a circular buffer is preferably used, wherein the newest received signal samples replace the oldest received signal samples in the buffer 115. In this manner, the buffer 115 contains a continually moving 'window' of the received signal 182 over time. The 'movement' of the window is generally in increments of 'pages', or 'blocks' of received signal samples. That is, for example, as each page/block of the buffer 115 is filled with the newest samples of received signal 182, the page/block that contains the oldest received signal samples is reallocated to receive the subsequent samples of received signal 182. Depending upon the particular embodiment, the stored signal 182 may be at RF, IF, or baseband frequency, with a corresponding pre-processor at subsequent stages to down-convert the RF or IF signals to a baseband signal. For ease of reference and understanding, it is assumed herein that the stored received signal 182 is a baseband signal, i.e. the common center frequency of the transmissions has been shifted to 0 Hz. The samples in receiver buffer 115 are therefore preferably in In-phase/Quadrature pairs, providing no loss of data due to aliasing. In this manner, the appearance of the transmitted messages 181*a-c* in the buffer 115 will therefore simply be the product of the spreading code and the information bit being transmitted from the transmitter. The minimum size of the receive buffer 115, to prevent the deletion of older signals before they have been fully processed, is discussed further below.

The message discriminator 120 accesses the signal in the buffer 115 for each of the tasks of signal detection and signal demodulation. In accordance with an aspect of this invention, the detection of received messages 182*a-c* within the composite signal 182, corresponding to transmissions 181*a-c* within the composite signal 181, is performed independent of the information content of the transmissions. That is, as contrast to conventional CDMA-DSSS the phase detector 130 within the discriminator 120 is configured to detect the presence of each distinguishable received signal 182*a-c* without searching for a particular known bit sequence, as typically contained in each conventional DSSS message preamble.

As is known in the art, the presence of a transmission at a particular code-phase is detected by determining the amount of correlation between the received signal and a locally generated spread spectrum sequence at that code-phase. The individual components of a spread spectrum sequence are referred to as "chips", to avoid confusion with information-carrying bits. Correlation is based on the coincidence of sampled values of the received signal to the chip values of the locally generated spread spectrum sequence. At the transmitter, the spread spectrum signal is formed by multiplying the spreading code chips by the information/data bit that is to be transmitted, effectively inverting each code chip when the information bit is at one logic value, and not inverting the code bit when the information bit is at the other logic value.

If the state of each chip is defined as +1 and −1, matching chip values will produce a positive value, and mismatched bits will provide a negative value. The conventional spread spectrum phase-detector/correlation-determinator sums the product of the received signal sequence and the locally generated sequence across an epoch (full-cycle) of the spreading code. If a large proportion of bits within an epoch of the spreading code are coincident, the sum of the products of the bits across the epoch will be have a large magnitude; if the proportions of matching and non-matching bits are approximately equal, the sum of the products will be approximately zero. If the polarity of the receiver is opposite that of the transmitter, a large negative value will be produced when the locally generated signal is at the same code-phase as the received signal. Thus, correlation is determined based on the magnitude of the correlation sum, a large positive or large negative sum indicating correlation, a zero or near-zero correlation sum indicating non-correlation.

However, transitions of the information bit cause a canceling effect on the magnitude of the correlation sum. Therefore, knowledge of where the transitions take place is generally required to reverse this canceling effect. In a conventional system, this knowledge is provided by knowing the sequence of bit values being transmitted at the beginning of each message, in other words, the preamble. However, viewed in this manner, recognizing that transitions cause a canceling effect, the inventors have recognized that alternative techniques can be used to determine where transitions occur, without a priori knowledge of the transmitted information bit values.

A preamble is used in conventional systems to allow all signal synchronization—including, most importantly, this information about the location of information bit transitions—before the actual information begins to arrive. It is, as noted earlier, a nonstochastic sequence shared by the transmitters and the receiver in order to allow the receiver to find, fix on, and determine the polarity and timing of the information about to arrive. By being nonstochastic, the integration of the signal can occur for an extended period of time (the duration of the preamble), which is necessary for initial signal detection. Once signal detection is performed, and the characteristics of the signal identified, bit-by-bit demodulation can proceed. That is, it takes more nonstochastic (predictable, pre-known) behavior in the transmitted signal to initially identify the presence, timing, and other parameters of the signal, then it does to subsequently track and demodulate that signal given those parameters. Alternately, in conventional systems, if no fixed preamble is used, actual information bits are lost as the receiver iteratively attempts different potential parameters, thus offering a yet worse penalty in bandwidth usage than a preamble would. In either event, information is not transferred for the amount of time it takes to lock on to the signal.

In this invention, the fact that there is a pre-existing nonstochastic sequence involved (the spreading code) with well-defined timing (the code phase) and many transitions (defined by the M-sequence), underlying the information content instead of preceding it, is used to eliminate the conventional need for a preamble. The presence of the data buffer 115 further eliminates the need for detection and signal lock to temporally precede the demodulation process. The phase detector 130 can coherently integrate within an information bit period, as described above, by performing a product and sum with the spreading code. Then, if necessary, the phase detector 130 may also subsequently integrate noncoherently, summing the magnitudes of earlier results, for a relatively long duration, including, for example, several information bits. Although noncoherent integration is less efficient for distinguishing a signal from noise, efficiency in this case is of less concern, as the noncoherent integration can simply be allowed to run longer.

Once the phase detector 120 has determined the signal characteristics, again by focusing on the underlying spreading code rather than the information bits, and using noncoherent integration over a longer duration to avoid the deleterious effect of information bit transitions, the demodulator 150 can trace the signal backward in the buffer 115 from the detection point to the signal beginning (or to the end of the prior demodulation of this signal), and then proceed forward in the buffer 115 from the detection point to the signal end (or to the end of the samples of this signal in the buffer). Most importantly, the only thing the transmitter needs to send are information bits, unknown in advance by the receiver, and all of which are acquired by the receiver.

In a straightforward embodiment of this invention, transitions of the information bit within an epoch are minimized, and/or only allowed at one or more known points within each spreading code epoch, so that coherent integration can be reliably performed without information bit transitions causing a negative impact on the result. In this manner, a reliable correlation sum can be provided without a priori knowledge of the transmitted information bits. That is, as noted above, if a transition of the information bit does not occur during an epoch, a large magnitude correlation sum will result, regardless of the actual value of the information bit. Other techniques for avoiding the cancellation effects based on knowledge, or determination, of possible transition points are discussed further below. For ease of presentation and understanding, the invention is initially presented using the paradigm of a transmission information bit extending across a single full epoch of the spreading code.

In accordance with a further aspect of this invention, the polarity of the information bits may be left intentionally ambiguous until the end of the demodulation process. That is, contrary to customary demodulation techniques where the polarity of "bit value 1" versus "bit value 0" is part of the information gathered during initial preamble acquisition, in this invention, the demodulator 150 gathers an entire message without needing to know whether it is using the same polarity as the transmitter. At the end of the entire message, a decision made. One method to make this decision is to take advantage of the fact that a message will typically contain error-checking information of some kind: if the message fails error-checking, the inverse polarity is tried. Alternatively, to avoid this ambiguity, polarity-independent encodings of, such as NRZ-M or NRZ-S encoding can be used, where bit-transitions are used to determine the logic value, rather than the absolute value of the bits.

In accordance with a further aspect of this invention, because a reliable correlation sum can be provided without knowledge of the transmitted information bits, the detection of transmissions can be achieved at virtually any point in the transmission, and not merely at the start of each message as in conventional systems. Thus, the conventional preamble that contains a known transmission bit sequence for enabling a receiver to synchronize to the code-phase of the transmitter is not required.

Because, as detailed above, any segment of the transmitted message can be used to determine the code-phase of the transmitted signal, the phase detector 130 is configured to regularly process a segment of the composite waveform in the receiver buffer 115 to determine each code-phase that exhibits a significant amount of correlated energy, hereinafter termed an active code-phase, as discussed further below. The phase detector 130 provides these identified active code phases to a demodulator 150.

The demodulator 150 accesses the receive buffer 115, and uses the identified active code phases to despread/demodulate the received signals 182a-c in the receive buffer 115 at each active code phase. The demodulator 150 routes each decoded signal from each active code-phase into a corresponding queue 160, thereby forming strings of messages in each queue 160, corresponding to each transmitted message 181a-c.

Figure 2:
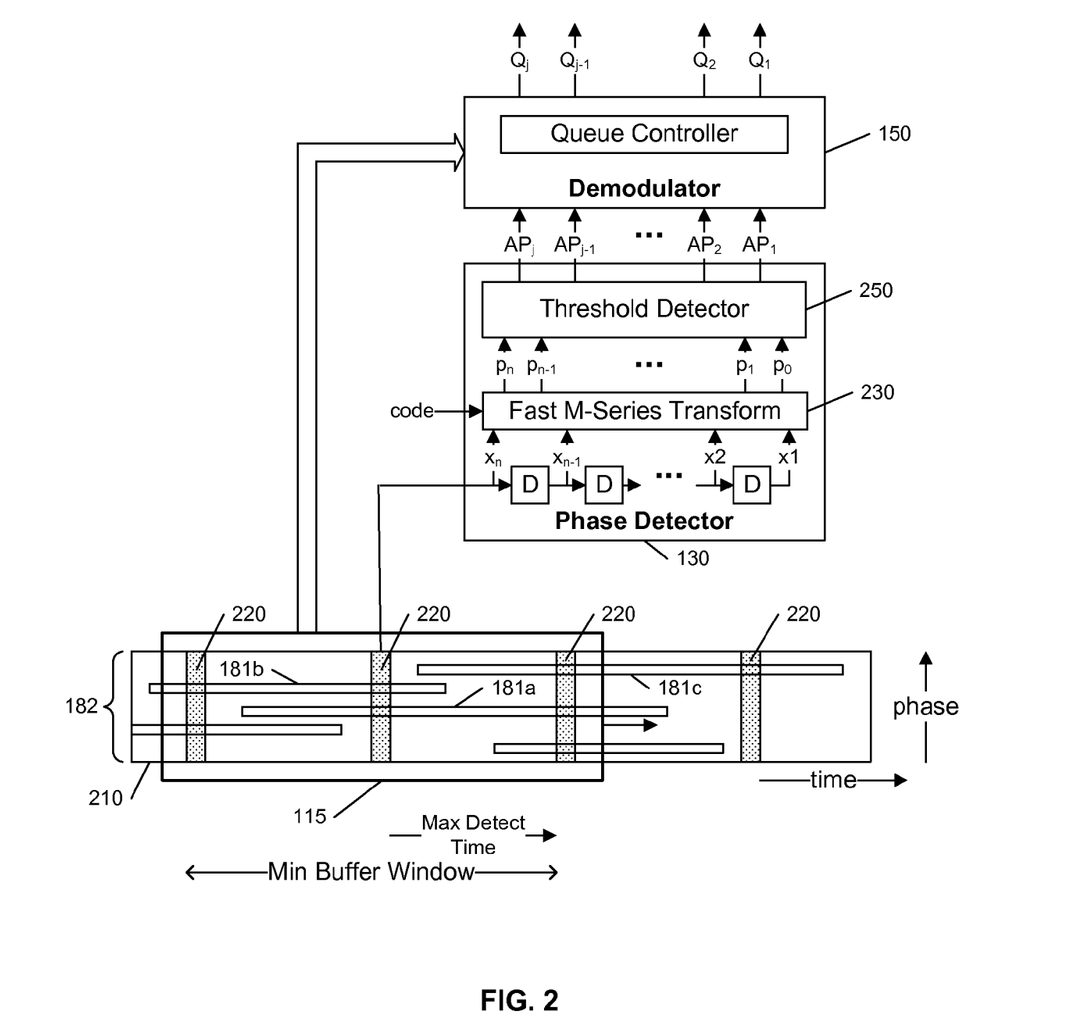
FIG. 2 illustrates an example block diagram of a receiver in accordance with this invention.

A preferred embodiment of the phase detector 130 is illustrated in the block diagram of FIG. 2. In FIG. 2, the block 210 illustrates the content of the composite signal 182 over time, with example received messages 182a-c. The phase detector 130 acquires a series of samples, preferably corresponding to an epoch of the spreading code, from a segment 220 of the composite signal 182 in the receive buffer 115.

Because each transmitted message 181a-c in this example is assumed to be free of transitions during each epoch of the spreading sequence, the received samples can be provided to a conventional "Fast M-Sequence Transform", also known as a "FMT", "Walsh-Hadamard Transform", "Walsh Transform", or "Hadamard Transform" 230 that is a full epoch wide. The Fast M-Sequence transform 230 is configured to identify the magnitude of the correlation at each code-phase using a series of additions and inversions based on the particular spreading code, as detailed in U.S. patent application Ser. No. 11/681,759, "SPREAD-SPECTRUM RECEIVER WITH FAST M-SEQUENCE TRANSFORM", filed 3 Mar. 2007 for James F. Stafford, Scott A. McDermott, and William F. Seng, and incorporated by reference herein. Other transforms may be used as well, including, for example, the Fast-Fourier transform disclosed in U.S. Pat. No. 6,985,512, "ASYNCHRONOUS SPREAD-SPECTRUM COMMUNICATIONS", issued 10 Jan. 2006 to Scott A. McDermott and Leif Eric Aamot, also incorporated by reference herein. Conventional CDMA-DSSS correlation determination techniques may be used, as well.

A threshold detector 240 compares each of the determined correlation magnitudes $p_0$-$p_n$ from the transform 230 to threshold criteria to identify the code-phases at which a correlated signal is found. If necessary, the detector 240 may limit the number of identified active code-phases to the capacity of the demodulator 150, typically prioritized by received energy content. Depending upon the expected signal-to-noise ratio of the received signal, a plurality of epochs within the segment 220 may be used to determine the active code-phases. In a straightforward embodiment, the magnitudes of the energy content at each epoch are added together for each code-phase and compared to a threshold value in the threshold detector 240.

The demodulator and queue controller 150 receives the identified active phases $AP_1$-$AP_j$ and searches the composite signal 182 in the receive buffer for the beginning and end of each message at the given active code-phase.

As illustrated in FIG. 2, the phase detector 130 repeatedly acquires samples of a segment 220 of the composite signal 182 from the receive buffer as time progresses. This sampling may occur periodically, or may occur whenever the phase detector 130 completes the processing of the prior segment 220. When an active phase is detected, the demodulator 150 traces back from the current segment 220 to determine the start of the message 282a-c at that active phase, and traces forward from the segment 220 to determine the end of the message, using the same techniques used in the phase-detector 130 to identify the presence of a correlated signal. Alternatively, the end of the message 282a-c can be determined as the message 282a-c is subsequently despread and demodulated.

The receive buffer 115 is preferably sufficiently sized to include a full interval from the current segment 220 back to the prior segment 220, and a full interval from the current segment 220 forward to the next segment 220. That is, the minimum size of the receive buffer 115 is preferably not less than twice the maximum span between sampling segments 220, as illustrated by the "Min Buffer Window" span in FIG. 2.

The span between sampling segments 220 should be at least as long as the maximum time required for the phase detector 230 to process the segment 220, as illustrated by the "Max Detect Time" span in FIG. 2. Alternative embodiments may include multiple phase detectors operating in parallel, or other enhancements, for which these minima and maxima would be correspondingly modified.

When the demodulation of each of the active phases is completed, the 'window' of the receive buffer 115, i.e. the portion of the composite signal 182 that is included in the receive buffer 115, can be advanced. In a straightforward embodiment, the buffer window is continually advanced, as discussed above with regard to a circular buffer; in an alternative embodiment, the buffer window is advanced to begin at the beginning of the last processed segment 220.

In an example embodiment of this invention, the duration of an epoch of the spreading code is 204 microseconds, the duration of the sampled segment 220 is 40 ms, and the period between sampled segments is 1.33 seconds. This period between sampled segments allows for the detection and demodulation of messages as short as 1.37 seconds, assuring that at least one segment 220 includes a full sample of the message. The duration between sample segments of over a second allows the phase detector 230 to be embodied as a software program, without requiring a very high speed processor. If the minimum message length is shorter, the period between sampled segments 220 is decreased, with a corresponding increase in the required speed of the processor, and corresponding decrease in the required buffer size 115; if the minimum message length is longer, the period between sampled segments 220 can be increased, with a corresponding decrease in the required speed of the processor, and a corresponding increase in the required buffer size 115.

Figure 3:
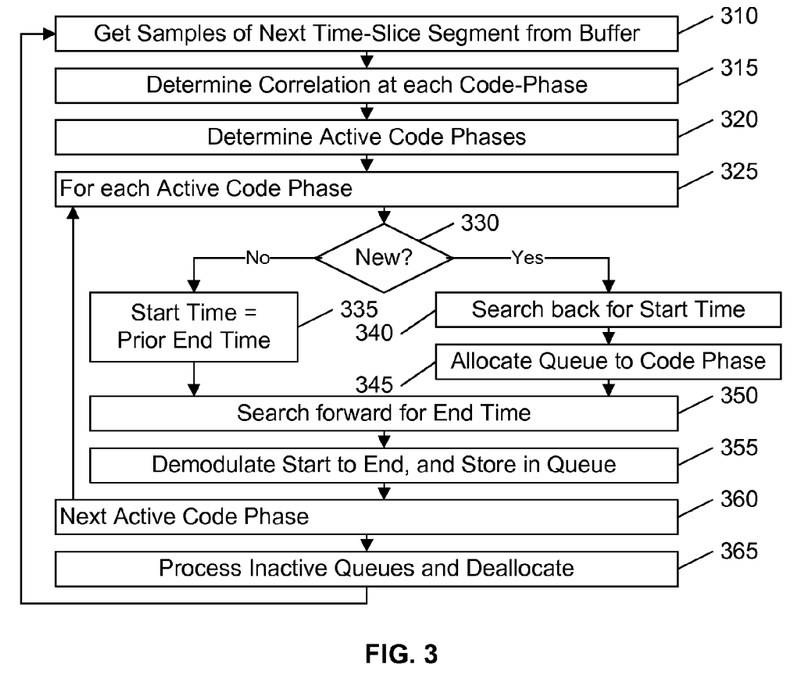
FIG. 3 illustrates an example flow diagram for detecting and demodulating multiple spread spectrum signals in accordance with this invention.

FIG. 3 illustrates an example flow diagram for operating the phase detector 130 and demodulator 150 in accordance with this invention. Specific references to components of the system refer to the example illustrated in FIG. 2 and are provided for ease of understanding only.

At 310, the phase detector 130 receives samples of the next time-slice segment 220 from the receive buffer 115, and the correlated energy at each code-phase is determined, at 315. At 320, the currently active code-phases, the code-phases having correlated energy greater than a given threshold, are identified and provided to the demodulator 150.

The demodulator 150 processes each active code-phase in the loop 325-360. At 330, the demodulator 150 determines whether the active code-phase being processed is a "new" active code-phase, i.e. a code-phase that was not identified as being continually active during the prior demodulation cycle, i.e. the demodulations based on the prior sample segment 220. In the example of FIG. 2, the code-phase of message 182a is 'new' to the segment 220 that is illustrated as being coupled to the phase detector 130. Conversely, message 182b would have been detected in the samples of the prior segment 220, and its code-phase would not be newly active at the segment 220 that is currently being processed.

If the active code-phase is new, the demodulator traces back through the receive buffer 115 for the start of the message at that code-phase, at 340. Generally, the start of a message at the code-phase is determined by detecting the earliest point at which the correlation at this code-phase is above a given threshold. Optionally, the absence of correlation may be defined as the lack of correlation over a given number of spreading code epochs, rather than the lack of correlation at one epoch. Alternatively, the start of the message can merely be defined as the time of the prior sample segment 220, and the determination of whether a valid signal is actually present at each epoch can be determined based on the correlation sum as the signal is despread for demodulation.

If the active code-phase is not new, the start time for this cycle of demodulation is defined as the end time of the message segment that was demodulated during the prior demodulation cycle, at 335. That is, until a message at a particular code-phase is determined to have become inactive, subsequent correlated signals at that code-phase are deemed to be a continuation of the prior message at that code-phase.

At 350, the demodulator 150 searches forward in the buffer 115 for an end of the message. If a message continues for the entire span of the signal in the buffer that is currently being processed, the last processed time is stored as the end time, and the code-phase is marked as being continually active. If, on the other hand, the correlated energy of a given number of epochs drops below a given threshold, the end time is defined as the time of this energy drop, and the code-phase is marked as being no longer active. As noted above, this determination of the end time and status of the code-phase may be performed during the subsequent despreading and demodulation of the received message.

At 355, the demodulator 150 applies the active code-phase to the composite signal 182 in the buffer 115 to despread the particular message 282a-c at that code-phase. Generally, the despread signal is an analog-like signal corresponding to the product of the received composite signal 182 and the ideal spreading code, and this product is processed/filtered to provide a stream of information bits that correspond to the transmitted information bits that were transmitted at this code-phase. These information bits are subsequently stored in the queue that had been allocated to this code-phase when this code-phase was determined to be newly-active (at 345, above).

At 365, the queues that are associated with code-phases that are determined to be no longer active are processed to offload the completed message from the queue. This can be performed as a 'clean-up' exercise after all the active code-phases are processed, as illustrated in FIG. 3, or it may be performed as each active code-phase is processed within the loop 325-360. The offloading generally includes determining polarity, if required, examining the message for an identified destination, or an identified source, and forwarding the message to a more permanent storage associated with the identified destination and/or source. As the data in each no-longer-active queue is offloaded, the queue is marked as being available for re-allocation to subsequent newly-active code-phases.

Upon completion of the above procedures, the process is repeated for the next detection and demodulation cycle, at 310. As noted above, these cycles may be periodic, wherein the next segment 220 is defined and sampled at fixed intervals, or aperiodic, wherein the next segment 220 occurs whenever the processing of the active code-phases identified in the current segment 220 is completed.

As is evident from the flow diagram of FIG. 3, the determination of each active code-phase from segments 220 of the composite signal 182, at 310-320, occurs independent of the location of the samples 220 within each message 182a-c. Consequently, the transmission of a sequence of known information bits in each message 182a-c would serve no apparent purpose, and need not be included in each message 182a-c. In this manner, the relative overhead associated with the transmission of information bits from the transmitters can be substantially reduced, and potentially eliminated.

The example embodiment of FIG. 2 assumes that transitions of the information bit do not occur within an epoch of the spreading code. In another embodiment of this invention, transitions are limited to defined or determinable points in the spreading code, and the correlation sum is determined by partitioning the determination of the correlation sum into information bit sized intervals of the spreading code.

Figure 4:
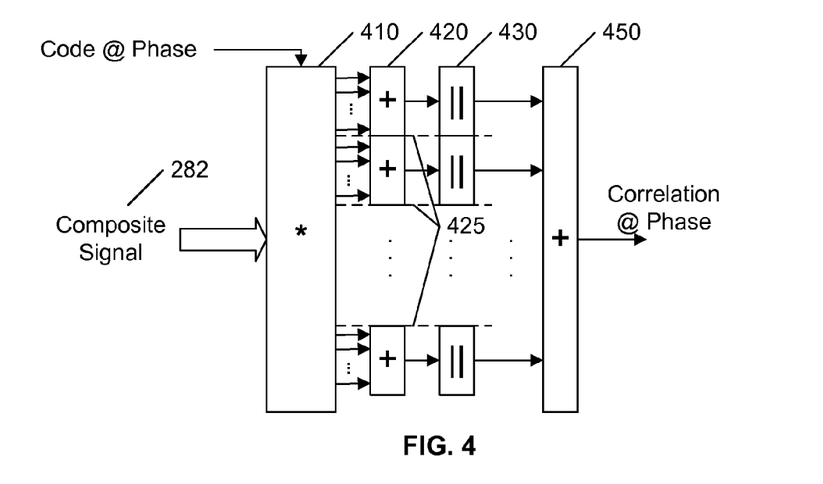
FIG. 4 illustrates an example block diagram of a multi-bit correlator in accordance with this invention.

FIG. 4 illustrates an example correlation-determinator that is configured to determine a correlation magnitude at a given code-phase independent of the values of the information bits that are encoded within an epoch of the spreading code. In FIG. 4, the correlation sum is determined by summing the magnitudes of partial sums of the correlation products between possible transition points 425 of the information signal, thereby eliminating the canceling effects caused by a mix of different information bit signal values within an epoch.

The correlator 410 is configured to multiply the input composite signal 282 with a spreading code at a given phase 401, to provide a correlation product term for each bit of the spreading code. In accordance with this aspect of the invention, individual adders 420 sum the correlation product terms corresponding to the width of a transmitted information bit, and magnitude determinators 430 provide the absolute value of each of these partials sums. An adder 450 sums the magnitude of the partial sums to provide a composite correlation sum, corresponding to the correlation of the composite signal 282 to the spreading code at the given phase.

If the boundaries 425 between adders 420 are located at the locations of possible transitions between information bits, the product terms of a predominant number of the code bits within the span between transitions 425 should correspond to either an inversion or non-inversion of the spreading code when the received message (282a-c of FIG. 2) within the composite signal 282 is at the given phase 401 of the spreading code. Under these conditions, each adder 420 will provide either a large positive sum or a large negative sum, and the sum of the absolute value of these large magnitude sums will be large, independent of the particular value of each of the transmitted information bits.

In a straightforward embodiment of this aspect of the invention, each transmitter is configured to constrain information bit transitions to a defined set of locations within the spreading code, and the boundaries 425 between adders 420 in the receiving system are located at this same defined set of locations. In a further embodiment of this invention, the transitions of the information bits are consistent among sequential epochs, such that determination of transitions in one epoch can be used to predict transition points 425 in other epochs.

That is, in accordance with this aspect of the invention, if the possible locations of the transitions of the information bits can be defined or determined, the canceling effects caused by changing information bits within an epoch of the spreading code can be avoided or eliminated, without a priori knowledge of whether an actual transition occurs in the transmitted signal at each transition point. That is, correlation is determined without a priori knowledge of the particular values of the transmitted information bits.

The foregoing merely illustrates the principles of the invention. It will thus be appreciated that those skilled in the art will be able to devise various arrangements which, although not explicitly described or shown herein, embody the principles of the invention and are thus within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A machine comprising:
   a receiver that is configured to receive a composite signal from transmitters that provide transmitted signals at different code-phases of a spreading code;
   a receive buffer that is configured to store the composite signal received during at least a buffer time interval;
   a phase detector that is configured to:
      receive a segment of the composite signal received during a sampling time interval within the buffer time interval, applying a plurality of samples of the segment of the composite signal to a Fast M-Series transform that is configured based on the spreading code, and identify one or more active code-phases corresponding to one or more of the transmitted signals based on outputs of the M-Series transform; and a demodulator that is configured to:
search the receive buffer for a start time of each transmitted signal within the buffer time interval based on energy content within the composite signal at the corresponding active code-phase; and demodulate each transmitted signal from the corresponding start time based on the corresponding active code-phase.

2. The machine of claim 1, wherein the phase detector identifies the active code-phase independent of data content of the corresponding transmitted signal.

3. The machine of claim 1, wherein the sampling time interval is substantially smaller than the buffer time interval.

4. The machine of claim 1, wherein the receive buffer is configured to store the composited signal received during a subsequent buffer time interval, the phase detector is configured to identify subsequent active code-phases based on subsequent samples from a subsequent segment of the composite signal, and the demodulator is configured to demodulate subsequent transmitted signals and associate the demodulated subsequent transmitted signals to one or more prior demodulated transmitted signals having a common code-phase.

5. The machine of claim 1, including:
a plurality of queues that are configured to receive demodulated data from the demodulator, each queue being associated with an active code-phase; and
a queue controller that is configured to:
receive identification of the active code-phases and corresponding start times from the demodulator,
allocate a new queue to each identified code-phase having a start time that is substantially different from a start of the buffer time interval, and
deallocate each prior queue having an associated code-phase that does not correspond to an identified active code-phase.

6. The machine of claim 1, wherein the demodulator is configured to search the receive buffer for an end time of each transmitted signal within the buffer time interval based on energy content within the composite signal at the corresponding active code-phase, and terminate demodulation of each transmitted signal at the corresponding end time.

7. The machine of claim 1, wherein each transmitted signal includes a plurality of information bits, and a duration of each information bit is at least as long as an epoch of the spreading code.

8. The machine of claim 1, wherein each transmitted signal includes a plurality of information bits, and the information bits are synchronous with the spreading code so as to reduce transitions of the information bits during an epoch of the spreading code.

9. The machine of claim 1, wherein the phase detector includes a transition detector that is configured to identify transitions of information bits in the transmitted signal during an epoch of the spreading code, and the demodulator is configured to demodulate the transmitted signal based on the identified transitions.

10. A machine comprising:
a receiver that is configured to receive a composite signal from a plurality of transmitters that provide transmitted signals of information bits that are encoded at different code-phases of a spreading code relative to the receiving system;
a receive buffer that is configured to store the composite signal received during at least a buffer time interval;
a phase detector that is configured to identify one or more active code-phases corresponding to one or more of the transmitted signals; and
a demodulator that is configured to demodulate each transmitted signal from the corresponding start time based on the corresponding active code-phase, without reliance on a sequence corresponding to predefined information bits in the transmitted signals.

11. The machine of claim 10, wherein the information bits are encoded using a polarity-independent encoding.

12. The machine of claim 10, wherein an error detection code is used to facilitate determination of a polarity of the information bits.

13. The machine of claim 10, wherein the phase detector is configured to use at least one of an M-Sequence transform and a discrete Fourier transform to facilitate identification of the active code-phases.

14. A method embodied in a communications machine comprising:
storing a received signal in a buffer,
determining an active code phase of a transmitted signal within the received signal based on an M-Transform of a sample of the received signal taken at a substantially random time after a start of the transmitted signal, the transmitted signal including information,
determining a start of the transmitted signal in the buffer based on the active code phase,
demodulating the transmitted signal from the start of the transmitted signal to an end of the transmitted signal in the buffer to reconstruct the information, and
providing the information as an output of the communications machine.

15. The method of claim 14, wherein the demodulating is performed without reliance on a predefined sequence of information bits encoded within the transmitted signal.

16. The method of claim 14, wherein the demodulating includes demodulating a polarity-independent encoding of the information bits.

17. The method of claim 14, including determining an error measure corresponding to the demodulating, and the demodulating includes determining a polarity of the information bits based on the error measure.

18. The method of claim 14, wherein the received signal includes a plurality of transmitted signals, the M-Transform of the system identifies an active code phase corresponding to each of the plurality of transmitted signals, and the demodulating includes demodulating each of the plurality of transmitted signals based on the corresponding active code phase.

19. The method of claim 18, including maintaining a plurality of queues for storing results of the demodulating of the plurality of transmitted signals.

20. A computer-readable medium that includes a computer program that configures a machine to:
store a received signal in a buffer,
determine an active code phase of a transmitted signal within the received signal based on an M-Transform of a sample of the received signal taken at a substantially random time after a start of the transmitted signal, the transmitted signal including information,
determine a start of the transmitted signal in the buffer based on the active code phase, demodulate the transmitted signal from the start of the transmitted signal to an end of the transmitted signal in the buffer to reconstruct the information, and provide the information as an output of the machine.

21. The computer-readable medium of claim 20, wherein the computer program configures the machine to demodulate the transmitted signal without reliance on a predefined sequence of information bits encoded within the transmitted signal.

22. The computer-readable medium of claim 20, wherein the computer program configures the machine to demodulate the transmitted signal by demodulating a polarity-independent encoding of bits of the information.

23. The computer-readable medium of claim 22, wherein the computer program configures the machine to determine an error measure corresponding to the demodulating of the transmitted signal, and to determine a polarity of the bits of the information based on the error measure.

24. The computer-readable medium of claim 20, wherein the received signal includes a plurality of transmitted signals, and the computer program configures the machine to identify an active code phase corresponding to each of the plurality of transmitted signals based on the M-Transform, and to demodulate each of the plurality of transmitted signals based on the corresponding active code phase.

25. The computer-readable medium of claim 24, wherein the computer program configures the machine to maintain a plurality of queues for storing results of the demodulating of the plurality of transmitted signals and to provide the results as an output of the machine.

* * * * *